United States Patent
Diosdado Borrego et al.

(10) Patent No.: US 12,275,190 B2
(45) Date of Patent: Apr. 15, 2025

(54) BUILD MATERIAL EXTRACTION

(71) Applicant: PERIDOT PRINT LLC, Palo Alto, CA (US)

(72) Inventors: Jorge Diosdado Borrego, Barcelona (ES); Sergi Culubret Cortada, Barcelona (ES); Sergio Puigardue Aramendia, Barcelona (ES)

(73) Assignee: PERIODOT PRINT LLC, Palo ALto, CA (US)

( * ) Notice: Subject to any disclaimer, the term of this patent is extended or adjusted under 35 U.S.C. 154(b) by 162 days.

(21) Appl. No.: 17/796,420

(22) PCT Filed: Jun. 9, 2020

(86) PCT No.: PCT/US2020/036824
§ 371 (c)(1),
(2) Date: Jul. 29, 2022

(87) PCT Pub. No.: WO2021/251955
PCT Pub. Date: Dec. 16, 2021

(65) Prior Publication Data
US 2023/0049392 A1 Feb. 16, 2023

(51) Int. Cl.
*B29C 64/35* (2017.01)
*B29C 64/165* (2017.01)
(Continued)

(52) U.S. Cl.
CPC ............ *B29C 64/35* (2017.08); *B29C 64/165* (2017.08); *B29C 64/393* (2017.08); *B33Y 10/00* (2014.12);
(Continued)

(58) Field of Classification Search
None
See application file for complete search history.

(56) References Cited

U.S. PATENT DOCUMENTS 6,033,788 A 3/2000 Cawley et al.
9,815,118 B1 * 11/2017 Schmitt .................. B22F 10/40
(Continued)

FOREIGN PATENT DOCUMENTS

EP 3117982 1/2017
WO WO-2018156938 A1 * 8/2018 ............ B22F 1/0059
(Continued)

OTHER PUBLICATIONS

Kip Hanson, Metal Milestones in 3D Printing, Feb. 21, 2020, SME, 13 pgs.

*Primary Examiner* — Jamel M Nelson
(74) *Attorney, Agent, or Firm* — Shook, Hardy & Bacon L.L.P.

(57) ABSTRACT

A 3D printing apparatus is disclosed herein. The apparatus comprises a container, a build material extraction module, an energy source and a controller. The container is to receive a build volume comprising portions in which an un-cured thermally curable binder has been applied to define a 3D object to be generated and portions on which no binder has been applied. The build material extraction module is to remove part of the build material on which no binder has been applied. The energy source to heat the contents of the container. And the controller is to control the build material extraction module to remove part of the build material on which no binder has been applied; and control the energy source to heat the build material to thermally cure any binder in the container.

18 Claims, 3 Drawing Sheets

(51) Int. Cl.
  *B29C 64/393*  (2017.01)
  *B33Y 10/00*   (2015.01)
  *B33Y 30/00*   (2015.01)
  *B33Y 40/00*   (2020.01)
  *B33Y 50/02*   (2015.01)

(52) U.S. Cl.
  CPC .............. *B33Y 30/00* (2014.12); *B33Y 40/00* (2014.12); *B33Y 50/02* (2014.12)

(56) References Cited

U.S. PATENT DOCUMENTS

| | | |
|---|---|---|
| 10,377,061 B2 | 8/2019 | Wolfgang et al. |
| 2004/0084814 A1* | 5/2004 | Boyd ..................... B29C 64/35 264/109 |
| 2008/0241404 A1 | 10/2008 | Allaman et al. |
| 2015/0314530 A1 | 11/2015 | Rogren |
| 2017/0251713 A1 | 9/2017 | Warner et al. |
| 2019/0054697 A1* | 2/2019 | Alonso ................... B22F 10/73 |

FOREIGN PATENT DOCUMENTS

| | | |
|---|---|---|
| WO | WO-2019027419 A1 | 2/2019 |
| WO | WO-2019158620 A1 | 8/2019 |

\* cited by examiner

BUILD MATERIAL EXTRACTION

CROSS-REFERENCE TO RELATED APPLICATIONS

This application is a U.S. National Stage Application under 35 U.S.C. § 371 of International Application No. PCT/US2020/036824, filed Jun. 9, 2020, which is incorporated by reference herein.

BACKGROUND

Some additive manufacturing or three-dimensional printing systems generate 3D objects by selectively solidifying portions of successively formed layers of build material on a layer-by-layer basis. The build material which has not been solidified is separated from the 3D objects to continue with the additive manufacturing process.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1A:
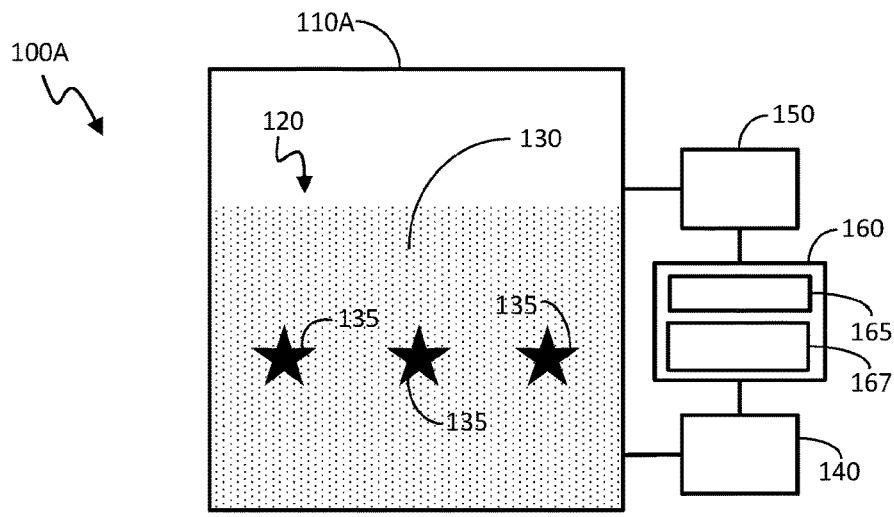
FIG. 1A is a schematic diagram showing an example of a 3D printing apparatus to extract build material.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

For simplicity, it is to be understood that in the present disclosure, elements with the same reference numerals in different figures may be structurally the same and may perform the same functionality.

3D printers generate 3D objects based on data in a 3D model of an object or objects to be generated, for example, using a CAD computer program product. 3D printers may generate 3D objects by selectively processing layers of build material. For example, a 3D printer may selectively treat portions of a layer of build material, e.g. a powder, corresponding to a layer of a 3D object to be generated, thereby leaving the portions of the layer un-treated in the areas where no 3D object is to be generated. The combination of the generated 3D objects and the un-treated build material may also be referred to as a build volume. The volume in which the build bed is generated may be referred to as a build chamber.

3D printers may selectively treat portions of a layer of build material by, for example, ejecting a printing liquid in a pattern corresponding to the 3D object. Examples of printing liquids may include fusing agents, detailing agents, curable binder agents or any printing liquid suitable for the generation of a 3D object. Additionally, the chemical composition of some printing liquids may include, for example, a liquid vehicle and/or solvent to be at least partially evaporated once the printing liquid have been applied to the build material layer. For simplicity, the liquid vehicle and/or solvents may be referred hereinafter as solvents.

Some three-dimensional printing systems use fusing agents to treat the portions of the layer of build material. The portions in which the fusing agent is applied are further heated so that the fusing agent absorbs such energy to heat up and melt, coalesce and solidify upon cooling the portions of build material in which the fusing agent was ejected thereto. The three-dimensional printing system may heat the build material by selectively applying energy from a focused energy source to each layer of build material.

Some three-dimensional printing systems use a thermally curable binder agent which has to be heated to a predetermined temperature to cause components of the liquid binder agent to bind together particles of build material on which it is applied. Such a liquid binder agent may comprise latex particles and curing of the binder may occur, for example, at a temperature above 100 degrees Celsius, or above 120 degrees Celsius, or above 150 degrees Celsius.

Such binder agents may be applied to successive layers of powdered metal build material, such as powdered stainless steel (e.g. SS316L) build material, and the curing of the binder agent leads to the generation of so-called "green parts". Green parts are generally relatively low-density objects formed by a matrix of metal build material particles and cured binder. Green parts are transformed into highly dense final objects by heating them in a sintering furnace to a temperature close to the melting point of the build material used. In the examples herein, a part generated by applying binder agents may be referred hereinafter as "brown part" if the binder has not yet been cured; and "green part" if the binder has been cured.

When using thermally curable binder agents, it may be unsuitable to cure binder agent on a layer-by-layer basis within a three-dimensional printing system. This may be the case, for example, if the temperature at which the binder particles of the binder agent cure is higher than the boiling point of a binder agent liquid carrier vehicle. Accordingly, such systems may first apply binder agent to successively formed layers of build material on a build platform in a build chamber, and then may separately (and after completion of the printing of binder agent) heat the contents of the build chamber to cure the binder agent therein. Once a thermally curable binder (referred hereinafter as binder agent) is ejected to a layer of build material, the portions in which the binder is ejected become bound together in a fragile manner through a force caused by the binder agent liquid carrier. A binder agent is a composition that may be cured upon receiving a certain amount of energy (i.e., heat). Once cured, the binder agent gains strength compared to the un-cured binder. 3D printers may therefore selectively deposit an amount of thermally curable binder in the plurality of build material layers in a build volume according to a print job. The build volume may then be heated to thermally cure any binder therein to generate a generally weakly bound green part. After curing, build material that is not part of the green parts may be extracted from the build chamber.

However, to cure a thermally curable binder agent within a build volume involves heating the build volume sufficiently to raise the temperature of the build volume to the temperature in which the binder cures. However, since the build material has a relatively low thermal conductivity, heating such a build volume is relative slow and uses a relatively high amount of energy. For example, curing and cooling the green parts within a stainless steel build volume of 30 cm×45 cm×75 mm may take up to 16 hours and 10 hours respectively. Therefore, curing in this way slows down the speed at which the green parts may be generated.

Additionally, during the curing process the solvents within the binder composition may migrate within the build volume which may cause undesired agglomeration of build material. This further complicates build material extraction operations to separate the build material from the green parts.

Suitable powder-based build materials for use in additive manufacturing include polymer powder, metal powder or ceramic powder. In some examples, non-powdered build materials may be used such as gels, pastes, and slurries.

Referring now to the drawings, FIG. 1A is a schematic diagram showing an example of a 3D printing apparatus 100A to extract build material 130.

The apparatus 100A comprises a container 110A. The container 110A is a receptacle to receive a build volume 120. In some examples, the container 110A is a five-wall receptacle sealable by a top lid. In other examples, the container 110A is a four-wall receptacle sealable by a top lid and a bottom platform. Additionally, the bottom platform may be moveable, for example vertically.

The build volume 120 to be received by the container 110A comprises portions in which an un-cured thermally curable binder agent has been applied in a 3D printer to define a 3D object to be generated (i.e., 3D objects 135). The build volume 120 also comprises portions of build material 130 on which no binder agent has been applied thereto. In some examples, the build volume 120 occupies substantially the entire inner volume of the container 110A. In other examples, the build volume 120 occupies a fraction of the inner volume of the container 110A.

The apparatus 100A further comprises a build material extraction module 140 to remove part of the build material 130 on which no binder has been applied. The build material extraction module 140 may be implemented in a number of different ways, examples of which are described herein.

In an example, the build material extraction module 140 comprises a controllable vibration element (e.g., vibration plate, eccentric motor) coupled to the controller 160 that causes the vibration element to vibrate. The vibration causes the fluidization of the build material 130 which can be directed to an external reservoir and thereby be extracted from the container 110A. The fluidized build material 130 may be directed to the external reservoir by means of, for example, a drain, an airflow or a sieve. In some examples, the controller 160 may control the vibration element to vibrate at very high frequencies (e.g., ultrasounds) for example at 20 kHz, and at low amplitudes, for example of 20 microns. Vibrating at high frequencies and low amplitudes enables the build material extraction module 140 to successfully remove build material 130 and to be gentle to the fragile 3D objects 135 to avoid breakage. However, the controller 160 may control the vibration element to vibrate at lower frequencies, for example 35 Hz, and higher amplitudes, for example 1 mm.

In another example, the build material extraction module 140 comprises a blowing device coupled to the controller 160 that causes the blowing device to blow and generate and airflow within the container 110A to fluidize the build material 130. Some examples of the blowing device may include a blowing nozzle, an airknife, a fan or a combination thereof. The fluidized build material 130 may be directed to an external reservoir to be thereby extracted from the container 110A.

In yet another example, the build material extraction module 140 comprises a vacuum generator to generate a negative relative pressure in a volume of the container 110A. The generated vacuum is to remove build material 130 on which no binder agent has been applied from the container 110A to an external reservoir.

The 3D printing apparatus 100A further comprises an energy source 150. The energy source 150 is to heat the contents of the container 110A. In some examples, the energy source 150 comprises resistive elements to emit heat, such as resistors or thermal blankets. However, the energy source 150 may be implemented as any other device suitable for heating the contents of the container 110A. The energy source 150 may be controlled to heat the contents of the container 110A up to the point that all binder agent present therein is thermally cured.

While the binder is being cured, some of the cured solvents may migrate towards the uppermost part of the build material 130 and may mix with the gas in contact with the build material (e.g., ambient air). In some examples, the container 110A may additionally comprise a gas renovation system to exhaust the mix of the gases with the solvents to avoid long solvent exposure to some portions of build material 130 which may otherwise affect build material recyclability.

The controller 160 comprises a processor 165 and a memory 167 with specific control instructions stored therein to be executed by the processor 165. The controller 160 is coupled to the build material extraction module 140 and the energy source 150. The controller 160 may control at least some of the operations of the elements that it is coupled therewith. The functionality of the controller 160 is described further below with reference to FIG. 2A.

In the examples herein, the controller 160 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller 160 may be, at least partially, implemented in the form of an electronic circuitry. The controller 160 may be a distributed controller, a plurality of controllers, and the like.

Figure 1B:
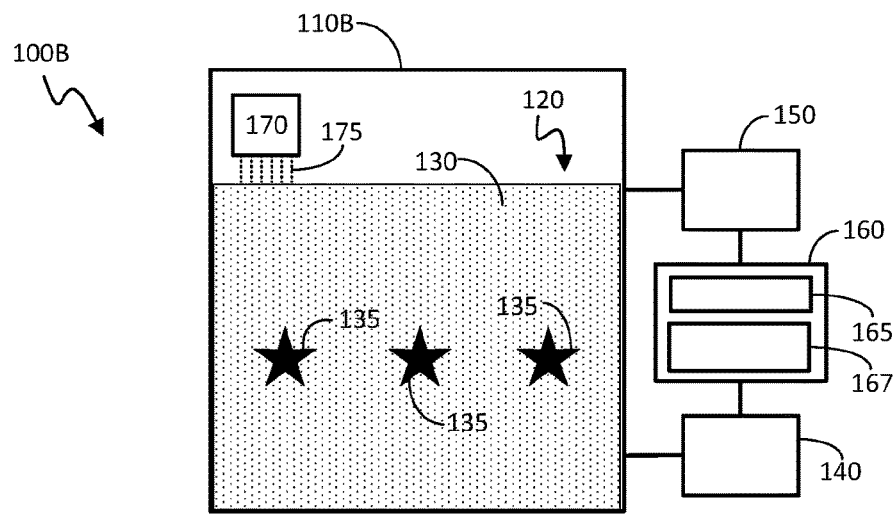
FIG. 1B is a schematic diagram showing an example of a 3D printer configured to extract build material.

FIG. 1B is a schematic diagram showing an example of a 3D printer 100B that is configured to extract build material 130. In some examples, the 3D printer 100B may be an alternative implementation to the 3D printing apparatus 100A from FIG. 1A. The 3D printer 100B may comprise previously disclosed elements from FIG. 1A referred to with the same reference numerals. The 3D printer 100B comprises the build material extraction module 140, the energy source 150 and the controller 160.

The 3D printer 100B comprises a build chamber 110B in which the 3D objects 135 are to be generated in a layer by layer basis. In some examples, the build chamber 110B is similar to the container 110A from FIG. 1A. Additionally, the build chamber 110B may comprise a bottom end platform which may be moveable vertically during the generation of the 3D objects 135.

The 3D printer 100B comprises an agent delivery mechanism 170 to selectively eject a printing liquid 175 to the uppermost layer of build material 130. The agent delivery mechanism 170 may eject the printing liquid 175 based on print job data. In some examples, the printing liquid 175 is an un-cured thermally curable binder. In other examples, the printing liquid 175 may be any other printing liquid 175 suitable for the generation of a 3D object in a layer-by-layer basis, such as a fusing agent or a detailing agent.

The controller 160 from the 3D printer 100B may be a similar controller as the controller 160 from FIG. 1A. The functionality of the controller 160 of the 3D printer 100B is described further below with reference to FIG. 2B.

Figure 2A:
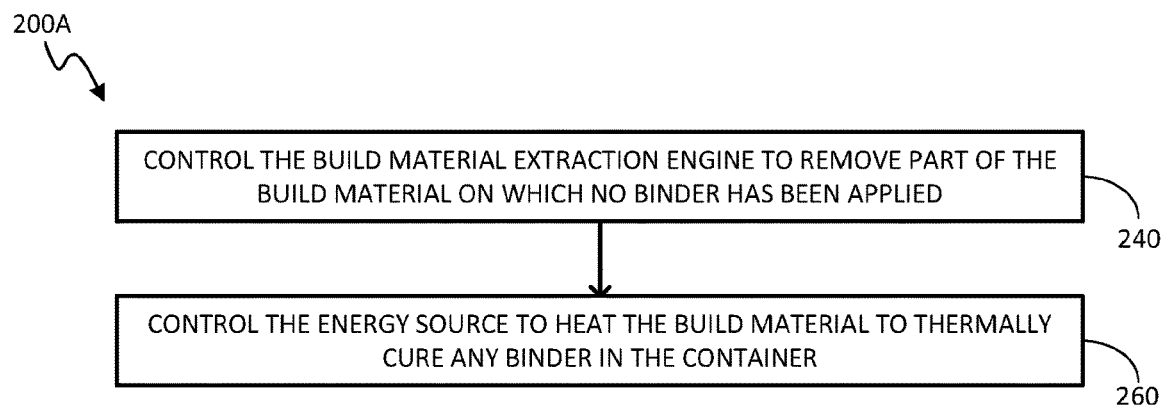
FIG. 2A is a flowchart of an example method of extracting build material from a 3D printing apparatus.

FIG. 2A is a flowchart of an example method 200A of extracting build material 130 from a 3D printing apparatus. The method 200A may involve previously disclosed elements from FIG. 1A referred to with the same reference numerals. In some examples, method 200A may be executed by the controller 160 of the 3D printing apparatus 100A.

The method 200A starts when a build volume 120 is received in the container 110A or generated in the build chamber 110B.

At block 240, the controller 160 controls the build material extraction module 140 to remove part of the build material 130 in which no binder has been applied. The controller 160 may control at least one of the vibration element, blowing device or the vacuum generator to gently remove part of the build material 130 without compromising the safety of the fragile 3D objects 135.

At block 260, the controller 160 controls the energy source 150 to heat the remaining build material 130 and 3D objects 135 to thermally cure any binder in the container 110A. Different binder compositions cure at different temperatures. The temperature in which the energy source 150 heat the contents of the container 110A may therefore vary depending on the composition of the binder. In an example, the energy source 150 may raise the temperature of the binder to a temperature ranging from 90° C. to 110° C., for example 95° C. In another example, the energy source 150 may raise the temperature of the binder to a temperature ranging from 150° C. to 250° C., for example 185° C. or 245° C.

The combination of executing a first partial build material removal operation and a later heating operation to cure the binder corresponding to the 3D objects enables the binder to be fully cured and cooled at a reduced time. This is because there is a reduced amount of build material 130 to be heated corresponding to the build material which has not been removed in the first partial build material removal operation. In some examples, the curing and cooling times after the first partial build material removal operation are independent of the original build volume size. For example, curing and cooling the green parts within an original stainless steel build volume of 30 cm×45 cm×75 mm may take less than 2 hours and less than 1 hour respectively; as opposed to the 16 hours and 10 hours that would take to cure and cool the same build volume without executing the first partial build material removal operation. Similarly, since the energy source 150 may heat a lower amount of build material 130, the amount of energy consumed by the energy source 150 to fully cure the binder within the container 110A is substantially reduced as well.

Furthermore, the solvents that migrate towards the uppermost part of the remaining build material 130 may contaminate a lesser amount of build material 130. This may lead to a better build material recyclability and an easier first partial build material removal operation, compared to a system that does not execute the first partial build material removal operation in which the build material to be extracted may have agglomerated by the solvents.

Additionally, after the binder has been cured, the controller 160 may control the build material extraction module 140 to remove, at least in part, the remaining build material 130 on which no binder has been applied from the container 110A. Since the binder is cured, its physical properties are enhanced which makes the green parts stronger and able to stand more aggressive cleaning methods than brown parts, therefore enabling the build material extraction module 140, in some examples, to vibrate at lower frequencies and higher amplitudes than the first partial build material removing operation. After this additional build material 130 extraction operation, the 3D objects 135 may be free or substantially free of build material 130 which is not intended to be part of the 3D objects 135. The additional build material 130 extraction operation may be used in an automated printing and cleaning system, as it enables green parts to be fully and automatically cleaned without any human intervention and makes them ready for sintering in a sintering furnace.

Figure 2B:
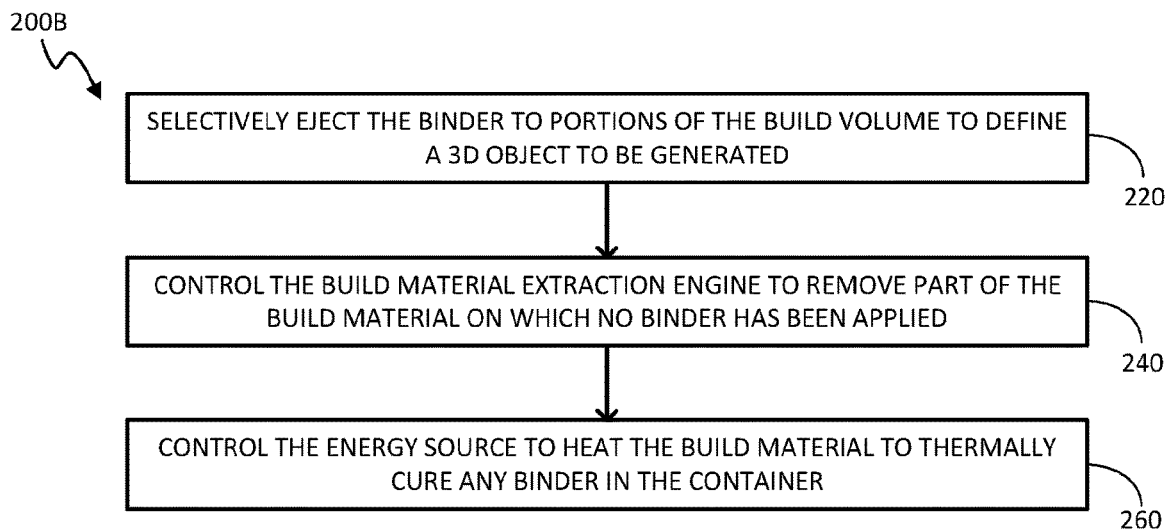
FIG. 2B is a flowchart of an example method of extracting build material from a 3D printer.

FIG. 2B is a flowchart of an example method 200B of extracting build material 130 from a 3D printer. The method 200B may involve previously disclosed elements from FIG. 1B referred to with the same reference numerals. In some examples, method 200B may be executed by the controller 160 of the 3D printing apparatus 100B.

At block 220, during the build volume 120 generation process, the controller 160 may control the agent delivery mechanism 170 to selectively eject the thermally curable binder liquid 175 on successfully formed layers of build material in the build chamber 110B to define a 3D object 135 to be generated. It should be noted that ejected binder agent is not thermally cured at this point.

Method 200B further comprises blocks 240 and 260, disclosed with reference to method 200A, in which a first partial build material removal operation and a later heating operation to cure the binder corresponding to the brown parts may be executed sequentially or may at least partially overlap.

Figure 3:
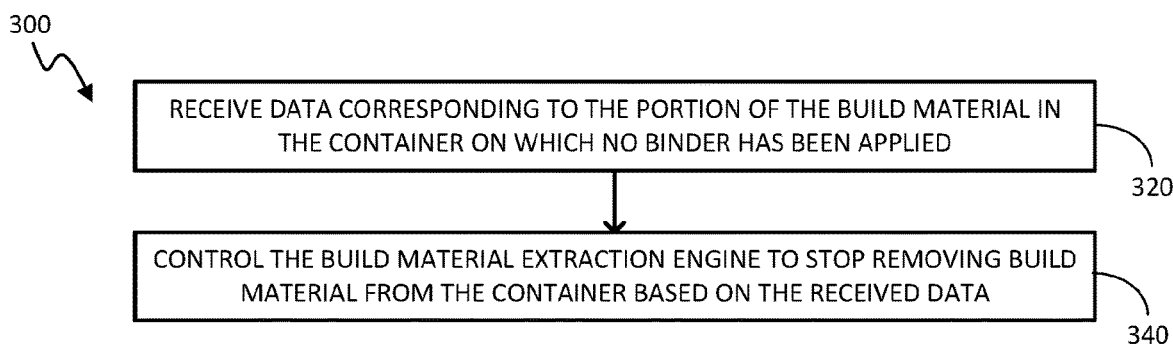
FIG. 3 is a flowchart of an example method of controlling a build material extraction module.

FIG. 3 is a flowchart of an example method 300 of controlling a build material extraction module 140. The method 300 may involve previously disclosed elements from FIG. 1A referred to with the same reference numerals. In some examples, method 300 may be executed by the controller 160 of the 3D printing apparatus 100A or the 3D printer 100B. In some examples, method 300 may be executed after block 240 of methods 200A or 200B.

At block 320, the controller 160 may receive data corresponding to the portion of the build material 130 in the container on which no binder has been applied. In an example, the received data may be indicative of the removed build material 130 weight. In some examples, a weighting device, such as a load cell or a scale, is located at the external container in which the removed build material 130 is transferred thereto. The load cell may measure the weight of the removed build material 130 and send data corresponding to the weight of the removed build material 130 to the controller 160. In another example, the received data may be indicative of the removed build material 130 volume. In some examples, a volumetric valve with a sensor may be installed at a conduit between the container 110A and the external container in which the removed build material 130 is transferred thereto. The volumetric valve with the sensor may measure the flow of the extracted build material 130 which is indicative of the volume of the removed build material 130. The volumetric valve with the sensor may send the data indicative of the removed build material 130 volume to the controller 160.

At block 340, the controller 160 controls the build material extraction module 140 to stop removing build material from the container 110A or the build chamber 110B based on the received data. In an example, the controller 160 may compare the received data (e.g., weight or volume of the removed build material 130) with a predetermined threshold value. Some examples of the predetermined threshold value may indicate that a 10%, 20%, 30%, 40%, 50%, 60%, 70, or 80% of the build material 130 has been removed. The threshold may be defined such that a large amount of build material 130 is removed without compromising the safety of the 3D brown parts 135 during the build material 130 extraction operation. Therefore, in some examples, the predetermined threshold is defined to include the portion of build material 130 in which no binder has been applied in combination with a safety threshold.

Additionally, the controller 160 may control the build material extraction module 140 to stop removing build material from the container 110A or the build chamber 110B based on the geometry of the brown parts 135. In some examples, the brown parts 135 may include fine parts which are more fragile than the main body of the part. In these examples, the controller 160 may define a larger safety threshold to protect these fine parts from breaking. In other examples, the brown parts 135 may be hollow or substantially hollow, which leads to build material 130 with no binder trapped in the volume of the brown parts 135. This trapped build material may not add protection to the fragile brown parts 135. Therefore, in these examples, the controller 160 may define the threshold value taking the amount of build material 130 trapped in the volume of the brown parts 135 into account.

Figure 4A:
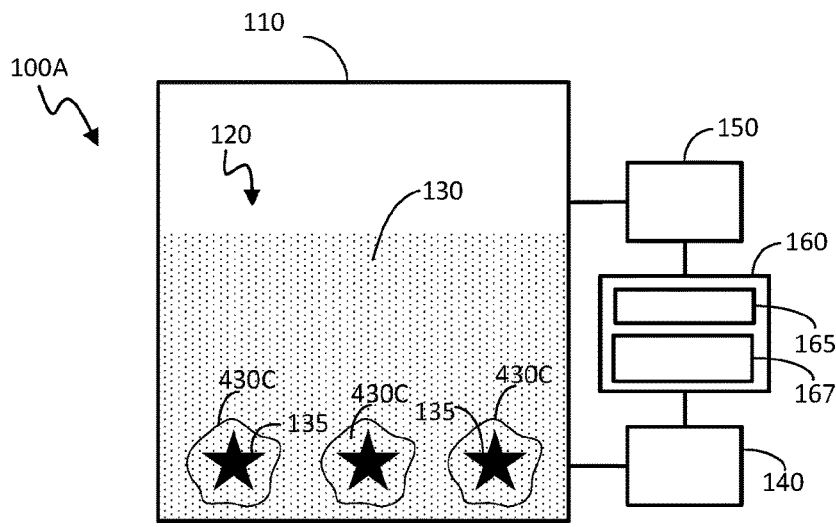
FIG. 4A is a schematic diagram showing an example of a 3D printing apparatus with green parts.

FIG. 4A is a schematic diagram showing an example of a 3D printing apparatus 100A or 3D printer 100B with brown parts 135. FIG. 4A may involve previously disclosed elements from FIG. 1A referred to with the same reference numerals.

Once the brown parts 135 are generated within the build volume 120, a portion of the surrounding build material 430C of each brown part 135 may agglomerate as a result of solvent leakage. The agglomerated build material 430C may have lower strength than the brown parts 135 but a higher strength than the rest of the build material 130 which is not affected by the binder agent solvents. Therefore, in a build material removal operation, the rest of the build material 130 which is not affected by the binder agent solvents may flow freely, as opposed to the agglomerated build material 430C, since the agglomeration caused by the solvents dispersed therein may oppose to the fluidification of the build material thereby protecting the brown part 135. As a consequence, in a build material removal operation, the build material 130 which is not affected by the binder agent solvents (referred hereinafter as free-flowing build material 130) may be removed before the agglomerated build material 430C.

Figure 4B:
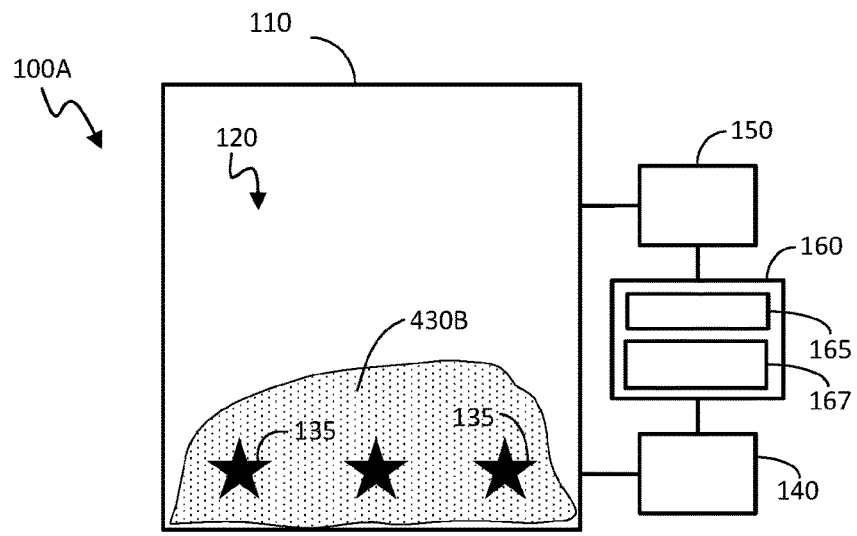
FIG. 4B is a schematic diagram showing another example of a 3D printing apparatus to heat build material.

FIG. 4B is a schematic diagram showing an example configuration of the contents of a 3D printing apparatus 100A or 3D printer 100B after the first build material 130 removal operation. FIG. 4B may involve previously disclosed elements from FIG. 1A referred to with the same reference numerals.

After the first build material 130 removal by the build material extraction module 140, the container may contain a substantially reduced single mass of build material 430B enclosing the brown parts 135. In this example, the brown parts 135 are well protected by the single mass of build material 430B including the agglomerated build material 430C and a portion of the free-flowing build material 130. However, the energy source 150 may heat the remaining single mass of build material 430B to cure the binder corresponding to the brown parts 135, which leads to a faster and more energy-efficient curing process as opposed to heating the full original build volume 120 of FIGS. 1A and 1B.

Figure 4C:
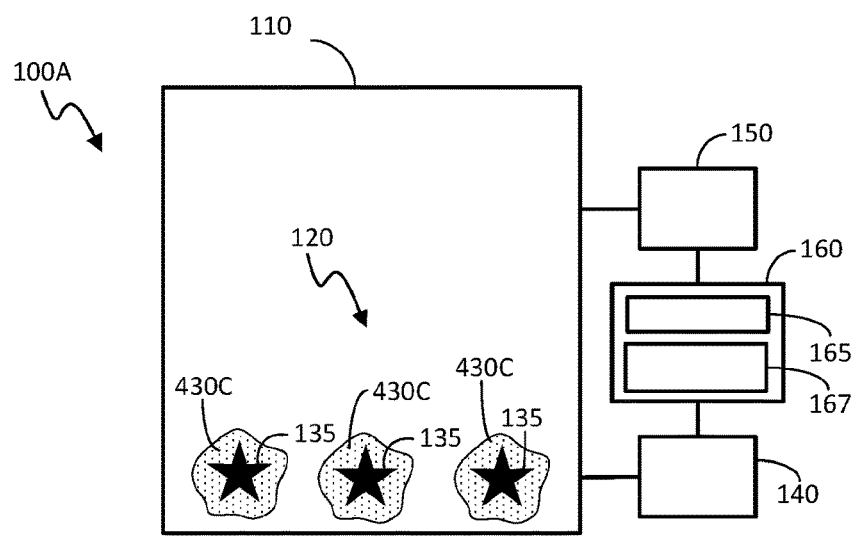
FIG. 4C is a schematic diagram showing another example of a 3D printing apparatus to heat build material.

FIG. 4C is a schematic diagram showing another example configuration of the contents of a 3D printing apparatus 100A or 3D printer 100B after the first build material 130 removal operation. FIG. 4C may involve previously disclosed elements from FIG. 1A referred to with the same reference numerals.

After the first build material 130 removal by the build material extraction module 140, the container may contain a plurality brown parts 135 being enclosed by a corresponding agglomerated build material 430C mass. The agglomerated build material 430C may have a protective shell shape enclosing a single, or a subset, of the 3D objects 135. The size and volume of the agglomerated build material 430C (e.g., protective shell) may be based on the size of the brown part 135, the amount of binder used to generate the brown part 135 and leakage rate of the solvents of the binder through the build material 130. In some examples the thickness of the agglomerated build material 430C may range from 0.5 cm to 1 cm. In other examples, the thickness of the agglomerated build material 430C may be thicker than 1 cm.

In this configuration, the brown parts 135 are in a more fragile situation than in the configuration of FIG. 4B since there is a less amount of build material protecting each of the brown parts 135. However, since the configuration of FIG. 4C comprises substantially less build material than the configuration of FIG. 4A, the curing time and the energy used to fully cure the binder agent forming the brown parts 135 is substantially reduced.

Figure 5:
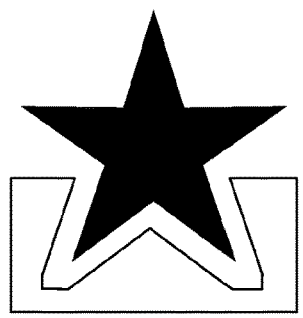
FIG. 5 is a schematic diagram showing an example of a 3D printed object with a 3D printed support.

FIG. 5 is a schematic diagram showing an example of a 3D printed object 135 with a 3D printed support 535. FIG. 5 may involve previously disclosed elements from FIGS. 1A and 1B referred to with the same reference numerals.

Some 3D object 135 geometries comprise fine parts which are fragile and vulnerable of breakage during the first build material extraction operation. Therefore, in some examples, a controlling device (e.g., 3D printer 100B, controller 160) may, in addition to defining the plurality of 3D objects 135 to be generated, define a support 535 corresponding to the 3D object 135 and located vertically below the 3D object 135. Therefore, in the printing operation, the agent delivery mechanism 170 may selectively eject the binder to portions of the build volume 120 in the build chamber 110B to define the 3D objects 135 and the corresponding support 535. In other examples, the container 110A may receive a build volume 120 with the 3D objects 135 and a plurality of supports 535 corresponding to the 3D objects 135 and located vertically below the 3D objects 135. In some examples, the 3D objects 135 may be located at an offset distance of the supports 535, for example 20 mm, 10 mm, 5 mm, 1 mm or 0.5 mm.

The addition of the supports 535 may avoid the 3D objects 135 or the fine parts of the 3D objects 135 to sag, bend or even break. Additionally, in some examples, the support 535 has a top surface shaped to cooperate with at least part of the bottom surface of the 3D object 135. In yet other examples, the top surface of the support 535 is shaped as a negative of, at least in part, the bottom surface of the 3D object 135.

Some build volumes 120 comprise a plurality of 3D objects 135 with the corresponding supports 535. In some examples, the agent delivery mechanism 170 may additionally define a set of supports unified with sacrificial linkages forming a support structure corresponding to a plurality of 3D objects and located vertically below the 3D objects 135. The support structure may provide with stability to the 3D objects 135 and the corresponding supports 535 during the first build material extraction operation, the heating operation and the latter build material extraction operation.

In one example, the binder agent can include a binder in a liquid carrier or vehicle for application to the particulate build material. For example, the binder can be present in the binding agent at from about 1 wt % to about 50 wt %, from about 2 wt % to about 30 wt %, from about 5 wt % to about 25 wt %, from about 10 wt % to about 20 wt %, from about 7.5 wt % to about 15 wt %, from about 15 wt % to about 30 wt %, from about 20 wt % to about 30 wt %, or from about 2 wt % to about 12 wt % in the binding agent.

In one example, the binder can include polymer particles, such as latex polymer particles. The polymer particles can have an average particle size that can range from about 100 nm to about 1 μm. In other examples, the polymer particles can have an average particle size that can range from about 150 nm to about 300 nm, from about 200 nm to about 500 nm, or from about 250 nm to 750 nm.

In one example, the latex particles can include any of a number of copolymerized monomers, and may in some instances include a copolymerized surfactant, e.g., polyoxyethylene compound, polyoxyethylene alkylphenyl ether ammonium sulfate, sodium polyoxyethylene alkylether sulfuric ester, polyoxyethylene styrenated phenyl ether ammonium sulfate, etc. The copolymerized monomers can be from monomers, such as styrene, p-methyl styrene, α-methyl styrene, methacrylic acid, acrylic acid, acrylamide, methacrylamide, 2-hydroxyethyl acrylate, 2-hydroxyethyl methacrylate, 2-hydroxypropyl acrylate, 2-hydroxypropyl methacrylate, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, or combinations thereof. In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: A 3D printing apparatus comprising:
   a container to receive a build volume comprising portions in which an un-cured thermally curable binder has been applied to define a 3D object to be generated and portions on which no binder has been applied;
   a build material extraction module to remove part of the build material on which no binder has been applied;
   an energy source to heat the contents of the container; and
   a controller to:
      control the build material extraction module to remove part of the build material on which no binder has been applied; and
      control the energy source to heat the build material to thermally cure any binder in the container.

Feature set 2: A 3D printing apparatus with feature set 1, wherein the controller is further to control the build material extraction module to remove part of the remaining build material on which no binder has been applied from the container.

Feature set 3: A 3D printing apparatus with any preceding feature set 1 to 2, wherein the container comprises a gas renovation system.

Feature set 4: A 3D printing apparatus with any preceding feature set 1 to 3, wherein the controller is to (i) receive data corresponding to the portion of the build material in the container on which no binder has been applied; (ii) control the build material extraction module to stop removing build material from the container based on the received data.

Feature set 5: A 3D printing apparatus with any preceding feature set 1 to 4, wherein the controller is to control the build material extraction module to stop removing build material from the container based on the geometry of the 3D object.

Feature set 6: A method comprising:
selectively ejecting a thermally curable binder liquid on successively formed layers of build material in a container to define a 3D object to be generated;
removing part of the build material from the container on which no binder has been applied; and
heating the remaining build material to a suitable temperature to thermally cure any binder therein.

Feature set 7: A method with feature set 6, further comprising removing part of the remaining build material on which no binder has been applied from the container.

Feature set 8: A method with any preceding feature set 6 to 7, further comprising: (i) determining the amount of the removed build material from the container; (ii) ceasing to remove build material from the container based on the determined amount of removed build material.

Feature set 9: A method with any preceding feature set 6 to 8, further comprising ceasing to remove build material from the container based on the geometry of the 3D object.

Feature set 10: A method with any preceding feature set 6 to 9, further comprising selectively ejecting the binder to portions of the build volume in the container to define a support corresponding to the 3D object and located vertically below the 3D object.

Feature set 11: A method with any preceding feature set 6 to 10, wherein the support has a top surface shaped to cooperate with at least a part of the bottom of the 3D object.

Feature set 12: A method with any preceding feature set 6 to 11, further comprising selectively ejecting the thermally curable binder liquid to: (i) define a plurality of 3D objects to be generated; and (ii) define a set of supports unified with sacrificial linkages forming a support structure corresponding to the plurality of 3D objects and located vertically below the 3D objects.

Feature set 13: A 3D printer comprising:
an agent delivery mechanism to selectively eject an un-cured thermally curable binder to portions of a build volume from a container;
a build material extraction module to remove part of the build material on which no binder has been applied;
an energy source to heat the contents of the container; and
a controller to:
selectively eject the binder to portions of the build volume to define a 3D object to be generated;
control the build material extraction module to remove part of the build material from the build volume on which no binder has been applied; and
control the energy source to heat the build material to thermally cure any binder in the container.

Feature set 14: A 3D printer with feature set 13, wherein the controller is further to control the build material extraction module to remove part of the remaining build material on which no binder has been applied from the container.

Feature set 15: A 3D printer with any preceding feature set 13 to 14, wherein the controller is further to control the agent delivery mechanism to selectively eject the binder to portions of the build volume to define a support corresponding to the 3D object and located vertically below the 3D object.

The invention claimed is:

1. A 3D printing apparatus comprising:
a container to receive a build volume comprising portions in which an un-cured thermally curable binder has been applied to define a 3D object to be generated and portions on which no binder has been applied;
a build material extraction module to remove part of a build material on which no binder has been applied;
an energy source to heat the contents of the container; and
a controller to:
receive data corresponding to the part of the build material in the container on which no binder has been applied;
control the build material extraction module to remove the part of the build material on which no binder has been applied;
control the build material extraction module to stop removing build material from the container based on the received data; and
control the energy source to heat the build material to thermally cure any binder in the container.

2. The 3D printing apparatus of claim 1, wherein the controller is further to control the build material extraction module to remove part of the remaining build material on which no binder has been applied from the container.

3. The 3D printing apparatus of claim 1, wherein the build material extraction module comprises a vibration element, wherein the controller causes the vibration element to vibrate during the removing of the part of the build material on which no binder has been applied.

4. The 3D printing apparatus of claim 1, wherein the build material extraction module comprises an air blowing device coupled to the controller, wherein the controller causes the air blowing device to generate airflow within the container during the removing of the part of the build material on which no binder has been applied.

5. The 3D printing apparatus of claim 1, wherein the controller is to control the build material extraction module to stop removing build material from the container based on the geometry of the 3D object.

6. The 3D printing apparatus of claim 1, wherein the build material extraction module comprises a vacuum generator to generate a negative relative pressure in the container to remove the part of the build material on which no binder has been applied.

7. The 3D printing apparatus of claim 1, wherein the received data indicates a weight of the removed part of the build material on which no binder has been applied.

8. The 3D printing apparatus of claim 7, further comprising an external reservoir, wherein the external reservoir receives the removed part of the build material on which no binder has been applied, and wherein the external reservoir comprises a weighting device.

9. The 3D printing apparatus of claim 8, wherein the removed part of the build material on which no binder has been applied is directed to the external reservoir via a drain.

10. The 3D printing apparatus of claim 8, wherein the removed part of the build material on which no binder has been applied is directed to the external reservoir via an airflow.

11. The 3D printing apparatus of claim 8, wherein the removed part of the build material on which no binder has been applied is directed to the external reservoir via a sieve.

12. The 3D printing apparatus of claim 3, wherein the vibration element is a vibration plate.

13. The 3D printing apparatus of claim 3, wherein the vibration element is an eccentric motor.

14. The 3D printing apparatus of claim 3, wherein the controller causes the vibration element to vibrate at 20 kHz and at 20 microns.

15. The 3D printing apparatus of claim 14, wherein the controller causes the vibration element to vibrate at 35 Hz and at 1 mm.

16. The 3D printing apparatus of claim 4, wherein the air blowing device is an airknife.

17. The 3D printing apparatus of claim 4, wherein the air blowing device is a blowing nozzle.

18. The 3D printing apparatus of claim 4, wherein the air blowing device is a fan.

* * * * *